UNITED STATES PATENT OFFICE.

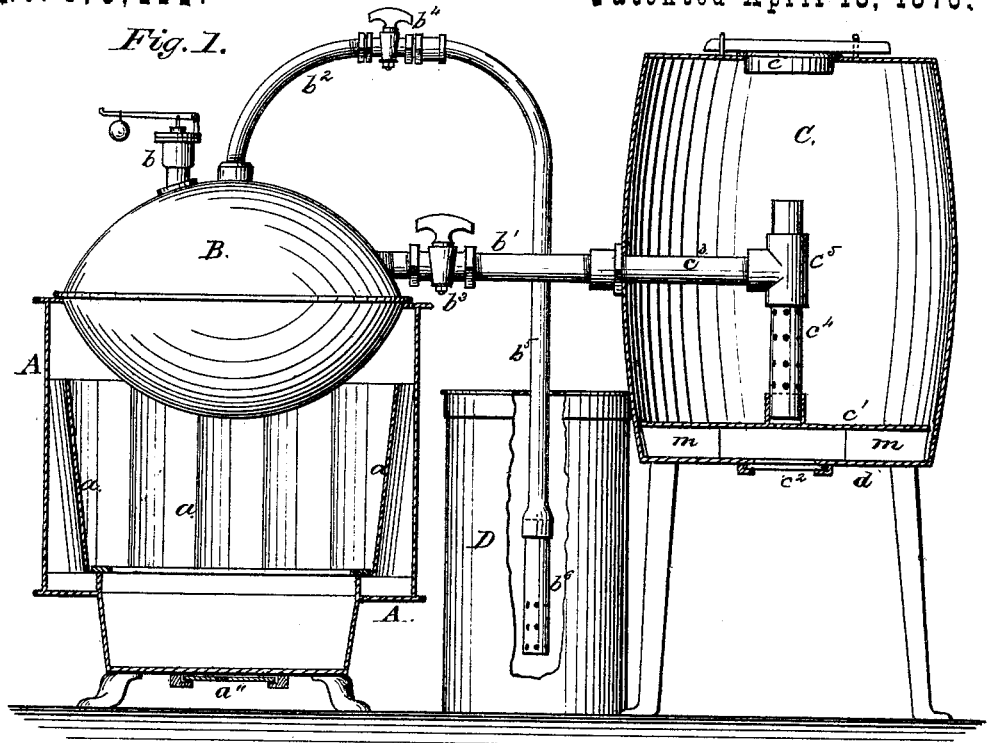
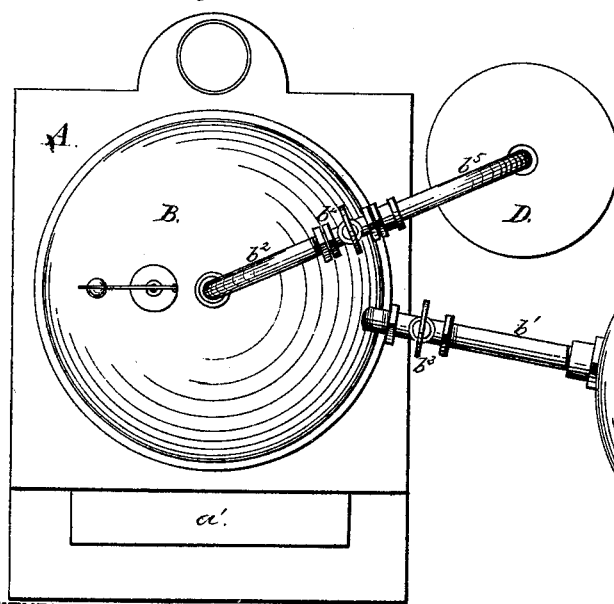
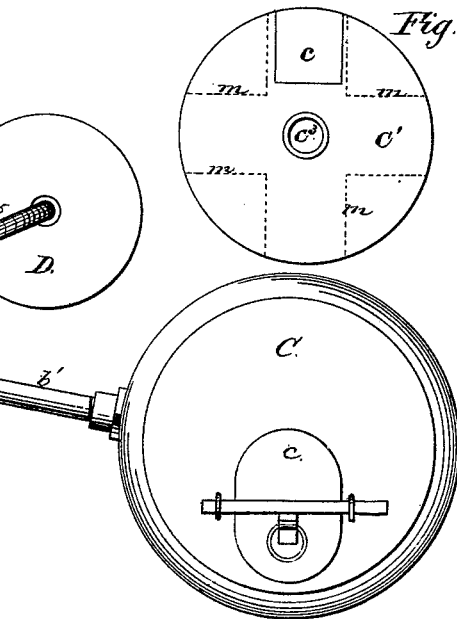

ELIAS STANGELAND, OF ROCK DELL, MINNESOTA.

IMPROVEMENT IN VEGETABLE-STEAMERS.

Specification forming part of Letters Patent No. 176,414, dated April 18, 1876; application filed April 1, 1876.

*To all whom it may concern:*

Be it known that I, ELIAS STANGELAND, of Rock Dell, in the county of Olmsted and State of Minnesota, have invented a new and Improved Grain and Vegetable Steamer and Water-Heater; and I hereby declare the following to be a full, clear, and exact description of the same:

The invention relates to an improved apparatus for steaming and cooking grain and roots for cattle, and is more particularly an improvement upon the apparatus for which I have obtained Letters Patent No. 44,985.

The improvement consists, mainly, in the construction of the false bottom of the vessel in which the grain or roots are steamed, as hereinafter described.

In the accompanying drawing, Figure 1 is a sectional elevation of my entire food-steaming apparatus, and Fig. 2 a plan view thereof. Fig. 3 is a plan of the false bottom of the steaming-vessel.

The furnace A has inclined inner sides $a$, draft-slide $a'$, and ash-discharge slide $a''$. The spheroidal-shaped boiler is provided with a safety-valve, $b$, and with screw-threaded nipples, to which pipes $b^1$ $b^2$ are respectively attached. The pipe $b^2$ has a flexible extension, $b^5$, and perforated nozzle, $b^6$, to adapt it for conducting steam into, and thereby heating the contents of, a water-holder, D. The respective pipes $b^1$ $b^2$ are provided with stop-cocks $b^3$ $b^4$.

The above-named parts are necessary to form a complete steaming apparatus. The wooden steaming cask or vessel C, to which my present invention especially appertains, has a tightly-fitting lid, $c$, in its top, and a slide, $c^2$, for closing a discharge-aperture in its bottom.

The false bottom $c^1$ is a metal plate having an opening at $c$, Fig. 3, but which is elsewhere imperforate. Vertical ribs $m$ are attached to the under side of said false bottom, and are arranged at right angles, as shown in dotted lines, Fig. 3. These ribs $m$ serve to support the bottom $c^1$, upon and above the true bottom $d$ of the cask C, and yet enable it to sustain the weight of the grain, roots, &c., with which the cask may be filled. They form practically part of the bottom $c^1$, so that both are removed or replaced together. The ribs likewise form the two sides of the discharge-opening $c$, preventing the grain spreading out over the true bottom $d$. The employment of a false bottom, $c^1$, is essential to prevent rotting of the wooden bottom $d$ by contact of the grain therewith and action of the steam thereon; also, to properly dry the grain at the bottom of the cask, which is effected by the steam passing underneath and thus heating the false bottom.

The short perforated steam-pipe $c^4$ is supported upon the false bottom, and, by means of a hollow T-connection, $c^5$, with the conducting-pipe $c^3$, the steam is distributed by said pipe through the whole mass of grain or other vegetable substance contained in the vessel A.

What I claim as my improvement in grain or vegetable steamers is—

The metal false bottom $c^1$, having the right-angular ribs $m$ attached to its under side, and provided with the opening $c$, in combination with the true bottom $d$, as shown and described.

ELIAS STANGELAND.

Witnesses:
SOLON C. KEMON,
CHAS. A. PETTIT.